No. 877,626. PATENTED JAN. 28, 1908.
L. F. ADT.
MOUNTING.
APPLICATION FILED MAY 3, 1907.
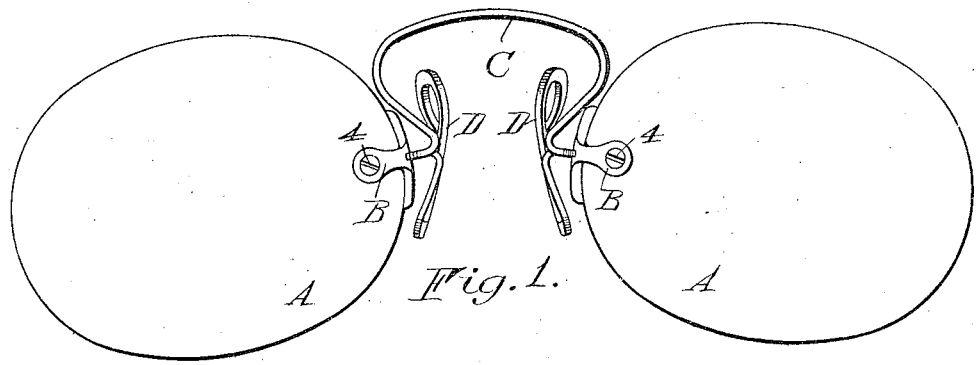
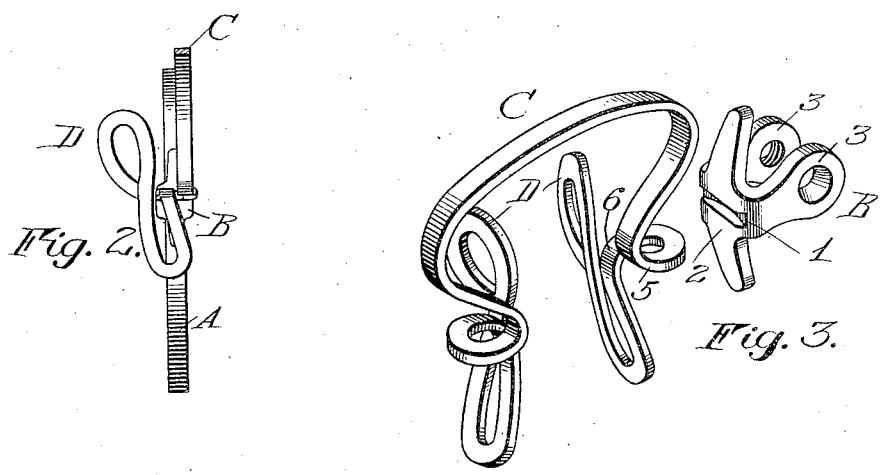

UNITED STATES PATENT OFFICE.

LEO F. ADT, OF ALBANY, NEW YORK.

MOUNTING.

No. 877,626.  Specification of Letters Patent.  Patented Jan. 28, 1908.

Application filed May 3, 1907. Serial No. 371,743.

*To all whom it may concern:*

Be it known that I, LEO F. ADT, of Albany, in the county of Albany and State of New York, have invented certain new and useful Improvements in Mountings; and I do hereby declare the following to be a full, clear, and exact description of the same, reference being had to the accompanying drawings, forming a part of this specification, and to the reference-numerals marked thereon.

This invention relates to eyeglasses and particularly to that type in which a spring bridge and nose guards are both connected to lens-attaching members; one object being to connect the spring bridge and the nose guards to the lens-attaching members in such a manner that the parts at the point of attachment will be as small as possible, and another object being to provide an improved mounting in which a single strip of material, preferably flat stock, is employed for forming the spring bridge and the nose guards.

To these and other ends the invention consists in certain improvements and combinations of parts all as will be hereinafter more fully described, the novel features being pointed out in the claims at the end of the specification.

In the drawings: Figure 1 is a front view of eyeglasses embodying my invention. Fig. 2 is a central vertical section through the eyeglasses, and Fig. 3 is a detached perspective view of a lens-attaching member and the combined bridge and guards.

The eyeglasses herein shown embody lenses A, lens-attaching members B, a spring bridge C, and nose guards D. The lens-attaching members B are provided in the outer faces of their edge-bearing portions 2 with horizontal pockets or grooves 1 having curved bottoms, and are connected to the lenses A in any suitable manner, as for instance, by parallel perforated ears 3 and screw bolts 4 passing through the usual openings in the lenses. The spring bridge C is provided at its ends with outwardly extending arms 5 which are connected to outwardly extending arms 6 on the nose guards D, one arm 5 and an adjacent arm 6 lying parallel and substantially in the same and a horizontal plane, and being fitted and soldered in a horizontal groove or pocket 1 in one of the lens-attaching members.

For purposes of economy and simplicity, it is desirable to form the bridge and the nose guards from a strip of flat stock. The strip is bent widthwise at its central portion to provide the substantially vertical bridge C having the outwardly extending horizontal portions or arms 5 at its ends. At the ends of the arms 5, the metal is doubled edgewise and inwardly in the plane of the arms 5 to provide the outwardly projecting portions 6 on the nose guards, and at the same time causing the formation of horizontal loops extending outwardly from the bridge ends and the guards and having the flat faces of the metal horizontal. The guards are formed by bending the strip widthwise and edgewise so that the strip extends downwardly and slightly forwardly from the portions 6, and then bending the strip edgewise so that it extends upwardly on ogee curves to points above the horizontal loops and rearwardly and downwardly on a forwardly extending curve, thereby providing guards each having two loops, one serving as the lower bearing pad and the other as the upper bearing pad.

It will be noted that the mounting herein shown and described requires no cutting, being formed solely by bending a single flat strip, thus not only securing a reduction of the number of mechanical operations in making the device, but preventing the waste of material from improper cutting. The horizontal loops increase the spring in the bridge and in the guards and provide very small, but strong connections between the lens-attaching members and these parts.

I claim as my invention:

1. In an eyeglass mounting, the combination of a bridge formed from flat stock and having at each end an outwardly extending horizontal portion with the flat faces of the stock horizontal, nose guards each having a portion formed from flat stock, extending outwardly with the flat faces of the stock horizontal and in the plane of the faces of one of the said horizontal portions of the bridge bends connecting the outwardly extending portions of the bridge and the guards, and lens-attaching members connected to the outer ends of said outwardly extending portions.

2. An eyeglass mounting formed from a single flat strip and comprising a bridge, two nose guards and horizontal loops, each of said loops connecting one of the nose guards and the bridge and extending outwardly both from the said nose guard and from the bridge, the portions of the strip forming the loop having their flat faces in the same plane.

3. An eyeglass mounting formed of a flat strip and comprising a bridge, nose guards and outwardly extending portions embodying edgewise bends connecting the guards to the bridge and arranged with the flat faces of the strip horizontal.

4. An eyeglass mounting formed from a single flat strip and comprising a bridge having horizontal portions extending outwardly therefrom, and guards provided with outwardly extending portions, each connected at its outer end by a bend to the outer end of one of the outwardly extending portions of the bridge, those portions of the strip forming the outwardly extending portions on the guards and on the bridge having their flat faces in the same plane.

5. In eyeglasses, the combination of lens-attaching members each having a horizontal pocket, a bridge, nose guards, and horizontal loops connecting the guards and the bridge and each projecting into the pocket in one of the lens-attaching members.

6. In eyeglasses, the combination of lens-attaching members each having a horizontal pocket, a bridge, nose guards, and horizontal loops connecting the guards and the bridge and each projecting into the pocket in one of the lens-attaching members, the bridge, the guards and the loops being formed from a flat strip having those portions forming each loop lying with their flat faces in the same plane.

LEO F. ADT.

Witnesses:
H. H. SIMMS,
FLORENCE E. FRANK.